United States Patent [19]

Dunlap

[11] Patent Number: 4,954,070
[45] Date of Patent: Sep. 4, 1990

[54] IN-MOLD LABEL DISPENSER HAVING SINGLE ACTUATOR FOR DISPENSING HEAD AND LABEL CARRIER

[75] Inventor: Richard L. Dunlap, Cairo, Ohio

[73] Assignee: Plastipak Packaging, Inc., Plymouth, Mich.

[21] Appl. No.: 330,095

[22] Filed: May 8, 1989

[51] Int. Cl.$^5$ ............................................. B29C 49/24
[52] U.S. Cl. .......................... 425/503; 156/DIG. 28; 156/DIG. 29; 264/509; 425/522
[58] Field of Search ............... 425/503, 504, 522; 264/509; 156/DIG. 28, DIG. 29

[56] References Cited

U.S. PATENT DOCUMENTS

| | | | |
|---|---|---|---|
| 3,292,209 | 12/1966 | Borkmann | 425/522 X |
| 3,324,508 | 6/1967 | Dickinson | 425/522 X |
| 4,355,967 | 10/1982 | Hellmer | 425/503 |
| 4,359,314 | 11/1982 | Hellmer | 425/503 |
| 4,397,625 | 8/1983 | Hellmer et al. | 425/503 |
| 4,479,644 | 10/1984 | Bartimes et al. | 271/107 |
| 4,479,770 | 10/1984 | Slat et al. | 425/503 |
| 4,479,771 | 10/1984 | Slat et al. | 425/503 |
| 4,498,854 | 2/1985 | Ross | 425/116 |
| 4,549,863 | 10/1985 | Bourgeois | 425/504 X |
| 4,582,474 | 4/1986 | Ziegler | 425/503 |
| 4,585,408 | 4/1986 | Darr | 425/503 |
| 4,636,166 | 1/1987 | Franks et al. | 264/509 X |
| 4,639,206 | 1/1987 | Darr | 425/503 |
| 4,639,207 | 1/1987 | Slat et al. | 425/503 |
| 4,679,997 | 7/1987 | Plenzler et al. | 264/509 X |
| 4,721,451 | 1/1988 | Darr | 425/503 |
| 4,802,832 | 2/1989 | Shapler | 425/504 X |
| 4,840,366 | 6/1989 | Johnston et al. | 264/509 X |

Primary Examiner—Richard L. Chiesa
Attorney, Agent, or Firm—Brooks & Kushman

[57] ABSTRACT

An in-mold label dispenser (42) for supplying labels to a plastic blow molding machine mold (32) whose mold sections open and close along a first direction (A) is disclosed as including a dispensing head (48) mounted for rectilinear movement between withdrawn and inserted positions along a second direction (B) perpendicular to the first direction (A) and supporting at least one label carrier (52) that provides transfer of labels (57) from a label supply (46). An actuator (50) moves the dispensing head (48) and a cam mechanism (58) moves each label carrier (52) between a retracted position and a label transfer position to provide the in-mold label operation. Each label carrier (52) extends from a first end thereof (54) about which pivoting takes place toward the mold to a second end (56) thereof along the second direction (B) in the retracted position and extends from the first end (54) thereof toward the second end (56) thereof along the first direction (A) in the label transfer position to thereby provide accurate registration during the in-mold labeling operation.

27 Claims, 11 Drawing Sheets

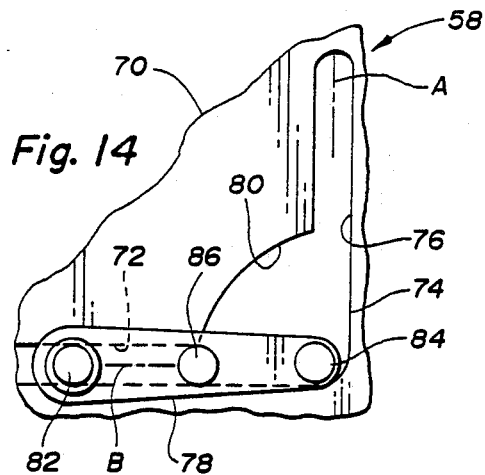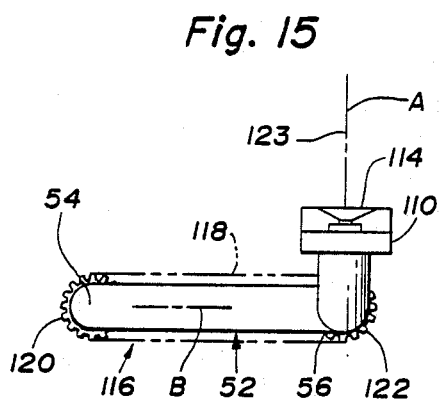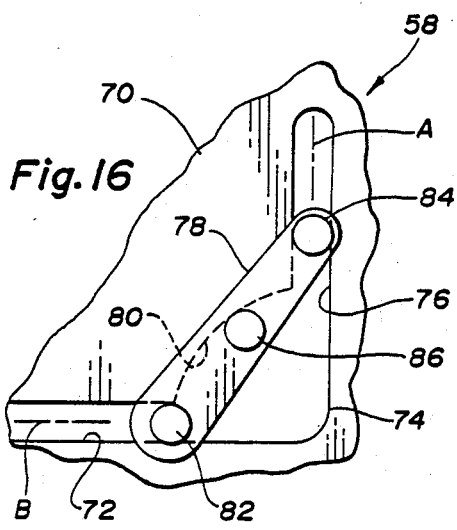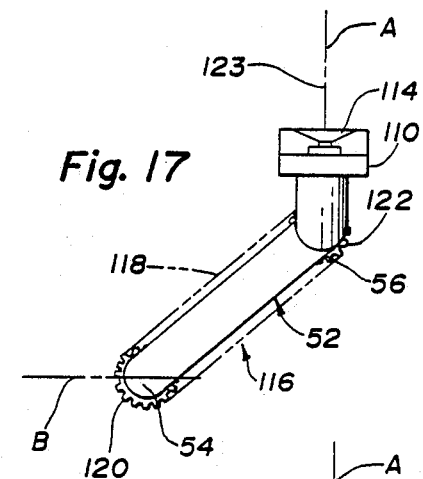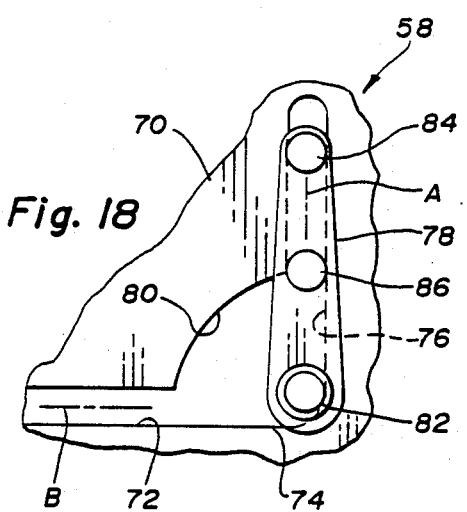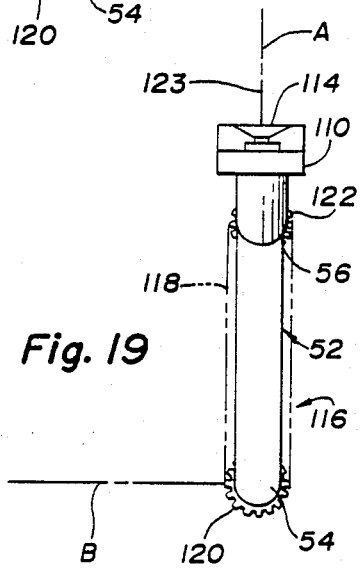

IN-MOLD LABEL DISPENSER HAVING SINGLE ACTUATOR FOR DISPENSING HEAD AND LABEL CARRIER

TECHNICAL FIELD

This invention relates to an in-mold label dispenser for use with a plastic blow molding machine.

BACKGROUND ART

Blow molding machines conventionally provide a parison, i.e. a tube of hot plastic, between open sections of a mold. Closing of the mold then clamps the parison and allows air to be blown into the parison such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated or other beverages, it is believed that in-mold labeling reduces the flow of carbon dioxide and other fluids through the container wall over a period of time and thereby increases the shelf life.

Prior in-mold label dispensers for blow molding machines conventionally include a label carrier having a vacuum cup that receives a label from a label magazine and is then moved to deposit the label within the mold cavity whereupon termination of a vacuum drawn at the vacuum cup allows a vacuum drawn at the mold cavity to secure the label in such a position in preparation for the blow molding Such vacuum type label carriers have previously been mounted on linkages that move the labels along an angular path with respect to the direction of opening and closing movement of mold sections of the mold in order to permit depositing of the labels in the confined space permitted by the extent of the mold opening. With the linkage type of label carrier, only one label can be deposited within the mold at a given time since movement of the linkage toward one mold section interferes with movement of a similar linkage toward an opposed mold section for depositing another label.

Another prior art type of in-mold label dispenser is disclosed by U.S. Pat. Nos. 4,355,967 and 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit labels on both mold sections of the mold at a given time due to the limited space present upon opening of the mold.

U.S. Pat. Nos. 3,292,209, 4,397,625 and 4,498,854 disclose in-mold label dispensers wherein fluid motors move label carriages and/or label carriers on the carriages to transfer labels from label stacks into associated molds. The in-mold label dispenser of the mentioned U.S. Pat. No. 3,292,209 is capable of labeling a dual cavity mold that permits increased output without requiring a faster cycle time.

U.S. Pat. No. 3,324,508 discloses an in-mold label dispenser wherein a linkage moves labels from rolls of labels to a mold where the labels are held by an electrostatic charge prior to the blow molding operation.

U.S. Pat. Nos. 4,479,770, 4,479,771 and 4,639,207 of William A. Slat, et al. disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels. Also, the in-mold label dispenser of the mentioned U.S. Pat. No. 4,479,771 patent provides labels to a plurality of label carriers with a single label magazine. This is accomplished by mounting the label carriers on a dispensing head which is moved past the label magazine and paused upon alignment of each label carrier with the label magazine to permit the supply of a label to the label carrier such that all of the label carriers receive labels prior to movement of the dispensing head to an inserted position between open mold sections to transfer the labels to the mold.

U.S. Pat. No. 4,479,644 discloses another type of in-mold label dispenser for use with a plastic blow molding machine.

U.S. Pat. No. 4,582,474 of William E. Ziegler discloses an in-mold label dispenser with different embodiments capable of providing labels to single, dual, and three cavity molds. In certain applications, multiple cavity molds are desirable to increase production from the blow molding machine while still maintaining the same cycle time such that quality can be maintained. The in-mold label dispenser that provides labeling of single, dual, and three cavity machines in accordance with the U.S. Pat. No. 4,582,474 patent has a carrier arm with a first end pivotally supported on a base of the dispenser for movement about a pivotal axis to move a dispensing head on a second end of the carrier arm along a curved path between withdrawn and inserted positions with respect to the mold. A drive mechanism of the dispenser includes a first drive that pivotally moves the carrier arm between the withdrawn and inserted positions and also includes a second drive that moves a label carrier on the dispensing head between the retracted and extended positions during cyclical operation that provides the in-mold labeling.

U.S. Pat. Nos. 4,585,408, 4,639,206, and 4,721,451 of Richard C. Darr disclose in-mold label dispensers for plastic blow molding wherein a dispensing head is moved with rectilinear motion between withdrawn and inserted positions with respect to the mold and is moved transverse to the direction of the rectilinear motion between an aligned position with respect to the open mold and a label transfer position. The in-mold label dispenser of U.S. Pat. No. 4,585,408 has an elongated support that mounts the dispensing head for the rectilinear movement and is itself mounted about a pivotal axis to support the dispensing head for pivotal movement between the aligned and label transfer positions. In the in-mold label dispenser of U.S. Pat. No. 4,639,206, a pair of locators mounted by base portions on opposite sides of the mold are engaged with each other as the dispensing head is moved to its inserted position to thereby provide support in locating the dispensing head prior to arcuate movement to the label transfer position for dispensing of labels. With both of these dispensers, disclosed arcuate movement of the dispensing head between its mold aligned and label transfer positions does not permit labeling of certain mold constructions since the degree to which the dispensing head can move arcuately is limited by the mold construction and the construction of cavity sections within the mold. In the in-mold label dispenser of U.S. Pat. No. 4,721,451, the dispensing head is moved rectilinearly between the aligned and label transfer positions in a transverse direction to the rectilinear movement between the withdrawn and inserted positions.

DISCLOSURE OF INVENTION

An object of the present invention is to provide an improved in-mold label dispenser for use with a plastic blow molding machine having a mold whose sections open along a first direction, with the dispenser having a dispensing head movable along a second direction perpendicular to the first direction and pivotally mounting a first end of a label carrier thereon, and with a single actuator of the dispenser moving the dispensing head along the first direction and pivoting the label carrier such that a second end thereof at an inserted position of the dispensing head between the open mold sections moves along the second direction to provide rapid and accurately registered placement of labels within the mold prior to the blow molding operation.

In carrying out the above object and other objects of the invention, the in-mold label dispenser functions to supply labels to a plastic blow molding machine mold including a pair of mold sections that define cavity sections and are mounted for movement along a first direction toward and away from each other without any other movement between an open position spaced from each other and a closed position where the cavity sections define an enclosed cavity in which blow molding is performed. The label dispenser includes a base, a label supply, and a dispensing head mounted by the base for rectilinear movement in a second direction perpendicular to the first direction between a withdrawn position with respect to the mold and an inserted position between the open mold sections An actuator of the in-mold label dispenser moves the dispensing head between the withdrawn and inserted positions. A label carrier of the dispenser has an elongated shape including a first end pivotally mounted on the dispensing head and a second end for carrying labels from the label supply to the mold. The label carrier has a retracted position where the elongated shape thereof extends from the first end thereof toward the mold to the second end thereof along the second direction during movement of the dispensing head between the withdrawn and inserted positions. The label carrier has a label transfer position where the elongated shape thereof extends from the first end thereof toward the second end thereof along the first direction to transfer a label thereon to the mold. A cam mechanism of the label dispenser pivotally moves the label carrier between the retracted and label transfer positions as the dispensing head moves to and from the inserted position while the second end of the label carrier is moved along the first direction during the pivoting of the label carrier to insure accurate positioning of the label within the mold under the impetus of the actuator.

In the preferred construction of the in-mold label dispenser, the base includes a slideway that mounts the dispensing head for movement between the withdrawn and inserted positions and the cam mechanism includes a cam mounted by the base. The cam has a rectilinear slot that extends parallel to the slideway along the second direction and the cam slot includes an end adjacent the mold where the cam has a camming surface that extends along the first direction perpendicular to the cam slot. The cam mechanism also includes a cam follower that moves along the cam slot and the cam surface to control the positioning of the label carrier.

The slideway preferably includes a pair of parallel rods on which the dispensing head is slidably supported. These rods are located in a spaced relationship with respect to each other as disclosed and are mounted on a framework that provides the base. The base framework preferably includes vertical legs and horizontal beams.

In it preferred construction, the cam also includes an arcuate opening extending between the camming surface and the cam slot. The cam follower includes a first follower member that is cammed by the camming surface of the cam and also includes a second follower member that moves through the arcuate opening of the cam as the dispensing head is moved to and from the inserted position.

The in-mold label dispenser preferably includes a connection between the cam mechanism and the label carrier for moving the label carrier between the retracted and label transfer positions in response to cam follower movement controlled by the cam. This connection preferably includes a gear and rack set for moving the label carrier in response to cam follower movement. The gear and rack set preferably includes a first gear rotated by the cam follower movement, an elongated rack moved by the first gear, and a second gear rotated by the rack movement and connected to the label carrier to provide pivoting thereof between the retracted and label transfer positions.

In the preferred construction disclosed, the cam mechanism is located above the label carrier and the connection between the cam mechanism and the gear and rack set includes a vertical connector shaft having an upper end connected to the cam mechanism to rotate the shaft in response to cam follower movement. The shaft also has a lower end connected to the first gear of the gear and rack set to rotate the first gear and thereby move the rack and rotate the second gear to pivot the label carrier in response to cam follower movement.

Orientation of the label carried by the label carrier is achieved by providing the second end of the label carrier with a label carrier member pivotally mounted thereon and associated with a positioner that pivots the label carrier member on the label carrier during the movement between the retracted and label carrier positions. This positioner preferably includes a continuous positioning loop, a first positioning wheel that moves the continuous positioning loop in coordination with the second gear of the gear and rack set, and a second positioning wheel that is rotated by the continuous positioning loop and fixed to the label carrier member to provide positioning thereof as the gear and rack set pivots the label carrier. Best results are achieved when the continuous positioning loop of the positioner is a chain and the first and second positioning wheels of the positioner are sprockets meshed with the chain.

As disclosed, the label dispenser includes a plurality of the label carriers for supplying labels to a multiple cavity type mold. Each label carrier is movable by operation of the cam mechanism between the retracted and label transfer positions under the impetus of the actuator.

Each disclosed embodiment of the in-mold label dispenser has the label supply including a label magazine shuttle and a shuttle actuator that moves the shuttle between a retracted position and a label transfer position with respect to the label carriers.

Another object of the invention is to provide an improved in-mold label dispenser for a multiple cavity blow molding machine wherein a single label magazine provides labels to a plurality of label carriers on a dispensing head by moving the label magazine on the shuttle to each label carrier with the dispensing head in a withdrawn position with respect to the mold and with the shuttle in the label transfer position.

In one embodiment of the in-mold label dispenser for carrying out this object, the shuttle includes a magazine carrier mounted thereon and supports the label magazine for movement to supply labels to a plurality of label carriers. This embodiment also includes a magazine carrier actuator that moves the magazine carrier along the shuttle and preferably includes a flexible drive member connected to the magazine carrier as well as including a rotary motor that drives the flexible drive member to move the magazine carrier.

The embodiment of the label carrier with the single magazine for providing labels to a plurality of label carriers is also disclosed as preferably including an eccentric for moving the label magazine along a cycloidal path toward and away from the label carriers as the magazine carrier is moved by the carrier actuator. A slave actuator of the label dispenser moves the eccentric in response to movement of the magazine carrier under the impetus of the carrier actuator. The slave actuator includes a flexible belt having opposite ends connected to the shuttle and a drive pulley driven by the flexible belt as the magazine carrier is moved by the carrier actuator. The drive pulley is connected to the eccentric to move the label magazine during such movement. This slave actuator also preferably includes an idler pulley that provides an increased wrap angle of the flexible belt about the drive pulley. As disclosed, the in-mold label also includes a slave eccentric and a continuous belt that connects the eccentrics to drive the slave eccentric.

In another embodiment of the in-mold label dispenser, the label supply includes a plurality of the label magazines mounted on the magazine carrier to simultaneously supply labels to all of the label carriers upon movement of the shuttle under the impetus of the shuttle actuator from the retracted position to the label transfer position.

The objects, features, and advantages of the present invention are readily apparent from the following detailed description of the best modes for carrying out the invention when taken in connection with the accompanying drawings.

BRIEF DESCRIPTION OF DRAWINGS

FIG. 14 is a plan view of the cam mechanism of the in-mold label dispenser illustrated in its position when the dispensing head is just slightly withdrawn from the inserted position illustrated in FIG. 2;

FIG. 15 is a plan view illustrating the retracted position of each label carrier as the dispensing head is moved between the withdrawn position of FIG. 1 and the position just adjacent the inserted position of FIG. 2 as illustrated by the cam mechanism position of FIG. 14;

FIG. 16 is a plan view illustrating the cam mechanism upon movement farther toward the inserted position from the position corresponding to FIG. 14;

FIG. 17 is a plan view that illustrates the label carrier movement from the retracted position toward the label transfer position and corresponds with the cam follower position of FIG. 16;

FIG. 18 is a plan view that illustrates the cam mechanism with the label dispenser in the fully inserted position of FIG. 2;

FIG. 19 is a plan view that illustrates the label carrier in the label transfer position corresponding to the cam follower position of FIG. 18.

BEST MODES FOR CARRYING OUT THE INVENTION

Figure 1:
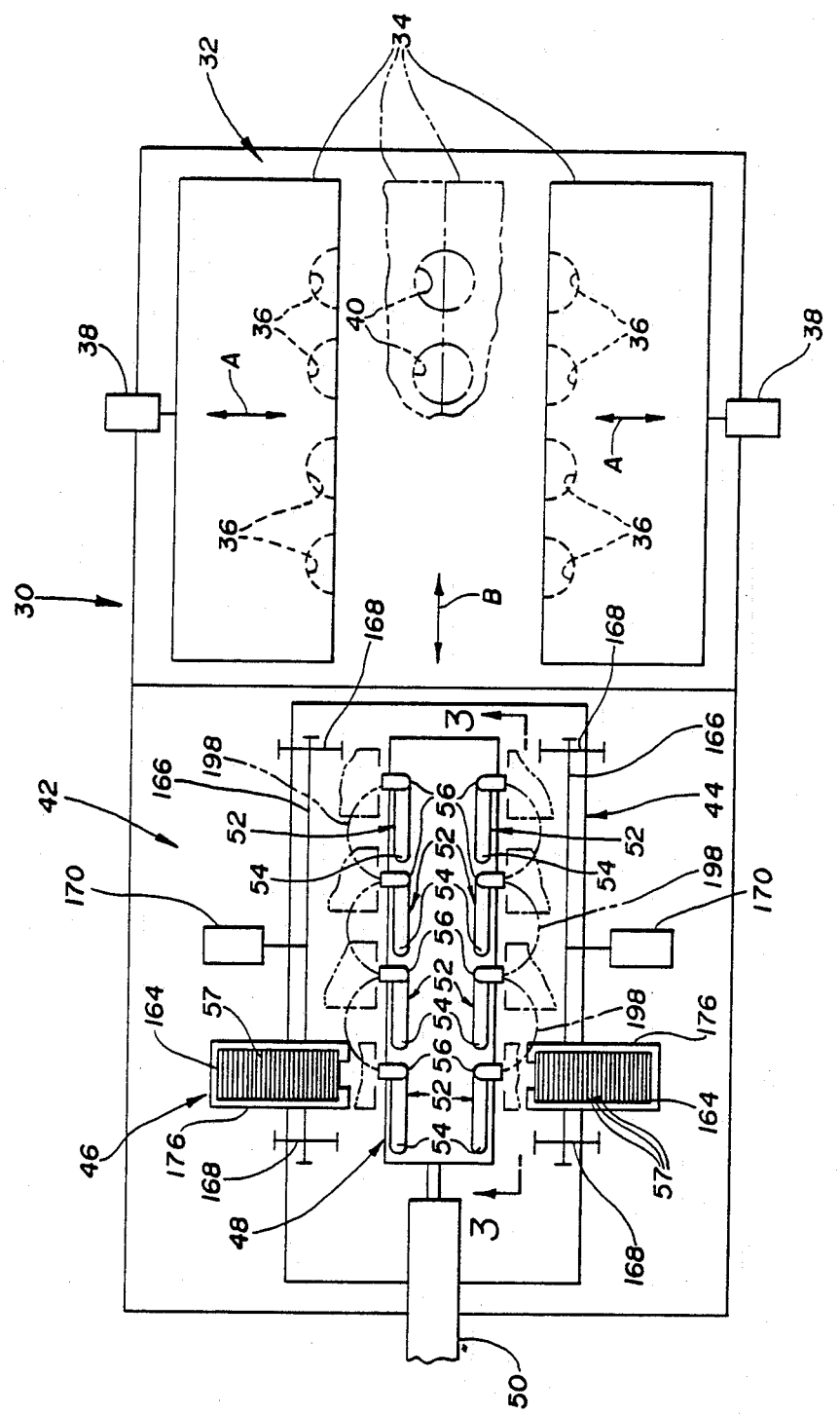
FIG. 1 is a top plan schematic view of an in-mold label dispenser for supplying labels to a plastic blow molding machine with a dispensing head of the dispenser shown in a withdrawn position with respect to open mold sections as shown by solid line representation as well as being illustrated in a closed position by phantom line representation.

With reference to FIG. 1 of the drawings, a plastic blow molding machine generally indicated by 30 is disclosed as including a mold 32 having mold sections 34 each of which includes at least one cavity section 36. As illustrated, the mold sections 34 each include a plurality of cavity sections 36 such that the mold 32 is of the multiple cavity type for blow molding multiple pieces during each machine cycle. Actuators 38 move the mold sections 34 along a first direction A between the solid line indicated open position and the phantom line indicated closed position where the cavity sections cooperatively define at least one cavity 40 and, as disclosed, define a plurality of the cavities for permitting the multiple piece blow molding during each cycle. Such blow molding is performed by closing of the mold 32 with a hot plastic parison within each cavity 40 such that blowing of the parison provides a blow molded product that corresponds to the cavity shape.

Figure 2:
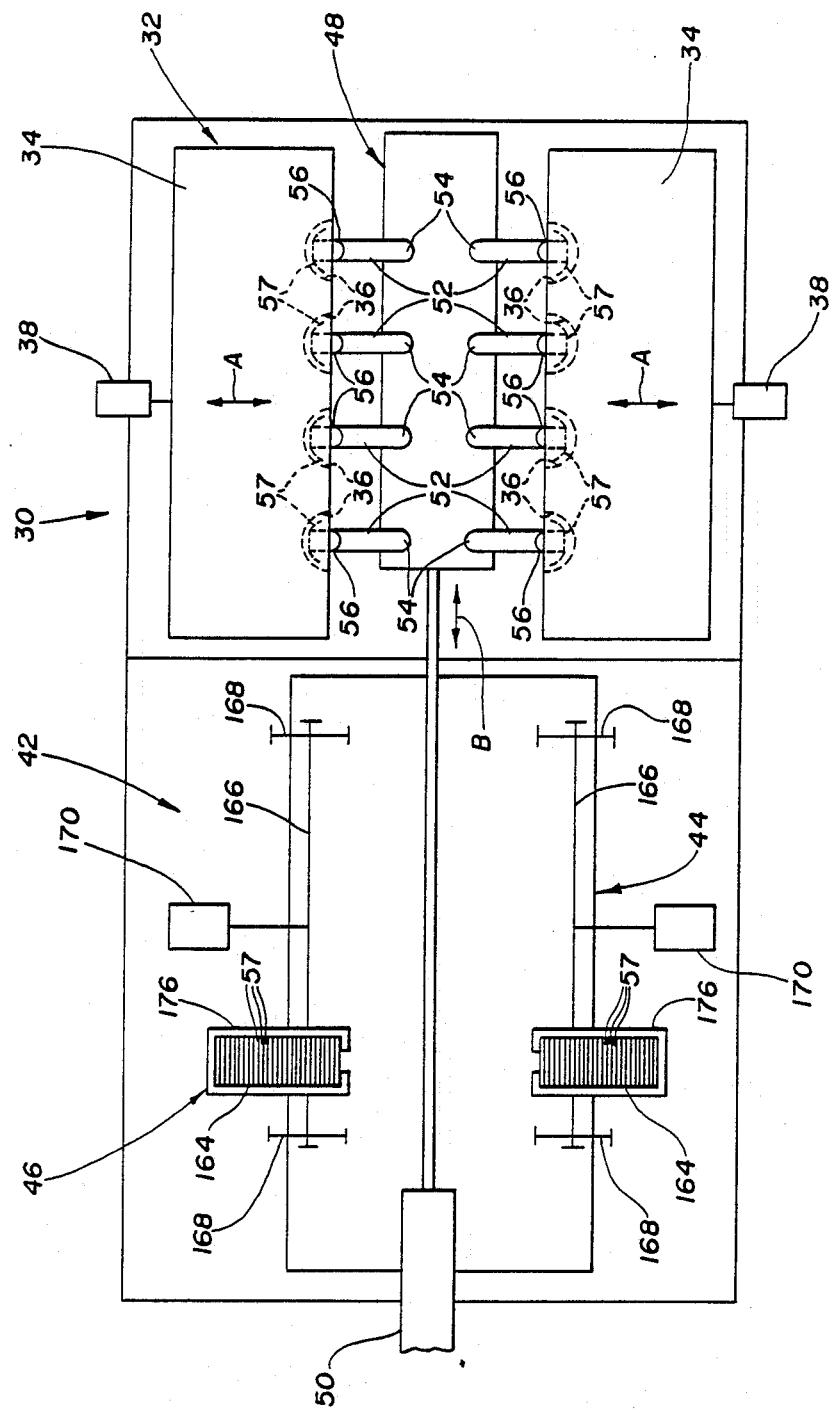
FIG. 2 is a top plan schematic view of the in-mold label dispenser with the dispensing head shown in an inserted position with respect to the open mold sections and with label carriers of the dispensing head moved from the retracted position of FIG. 1 to the label transfer position illustrated to transfer labels to cavity sections of the mold.

With continuing reference to FIG. 1, an in-mold label dispenser 42 constructed in accordance with the present invention includes a base 44, a label supply 46, and a dispensing head 48 mounted by the base 44 for rectilinear movement in a second direction B perpendicular to the first direction A between a withdrawn position as shown in FIG. 1 with respect to the mold 32 and an inserted position between the open mold sections 34 as shown in FIG. 2. An actuator 50 of the dispenser 42 moves the dispensing head 48 between the withdrawn and inserted positions as is hereinafter more fully described.

As shown in FIG. 1, the dispensing head 48 includes a plurality of label carriers 52 for transferring labels from the label supply 46 to the mold cavity sections 36 during cyclic operation that is hereinafter more fully described. More specifically, the illustrated embodiment of the label dispenser 42 includes a label carrier 52 associated with each mold cavity section 36 such that two labels are supplied to each enclosed cavity 40. However, it is also possible for the dispenser to provide one label to each cavity 40 and to be constructed for use with a single cavity mold even though the invention has particular utility for use with multiple cavity molds of the type illustrated.

Each label carrier 52 has an elongated shape including a first end 54 pivotally mounted on the dispensing head 48 and also includes a second end 56 for carrying labels 57 from the label supply 46 to the mold 32. The label carriers 52 have a retracted position as shown in FIG. 1 where the elongated shape of each label carrier extends from its first end 54 toward the mold 32 to its second end 56 along the direction B during movement of the dispensing head between the withdrawn and inserted positions respectively illustrated by FIGS. 1 and 2. Each label carrier 52 also has a label transfer position as illustrated in FIG. 2 where the elongated shape thereof extends from its first end 54 toward its second end 56 along the first direction A to transfer a label 57 thereon to the mold 32 within the associated cavity section 36.

Figure 3:
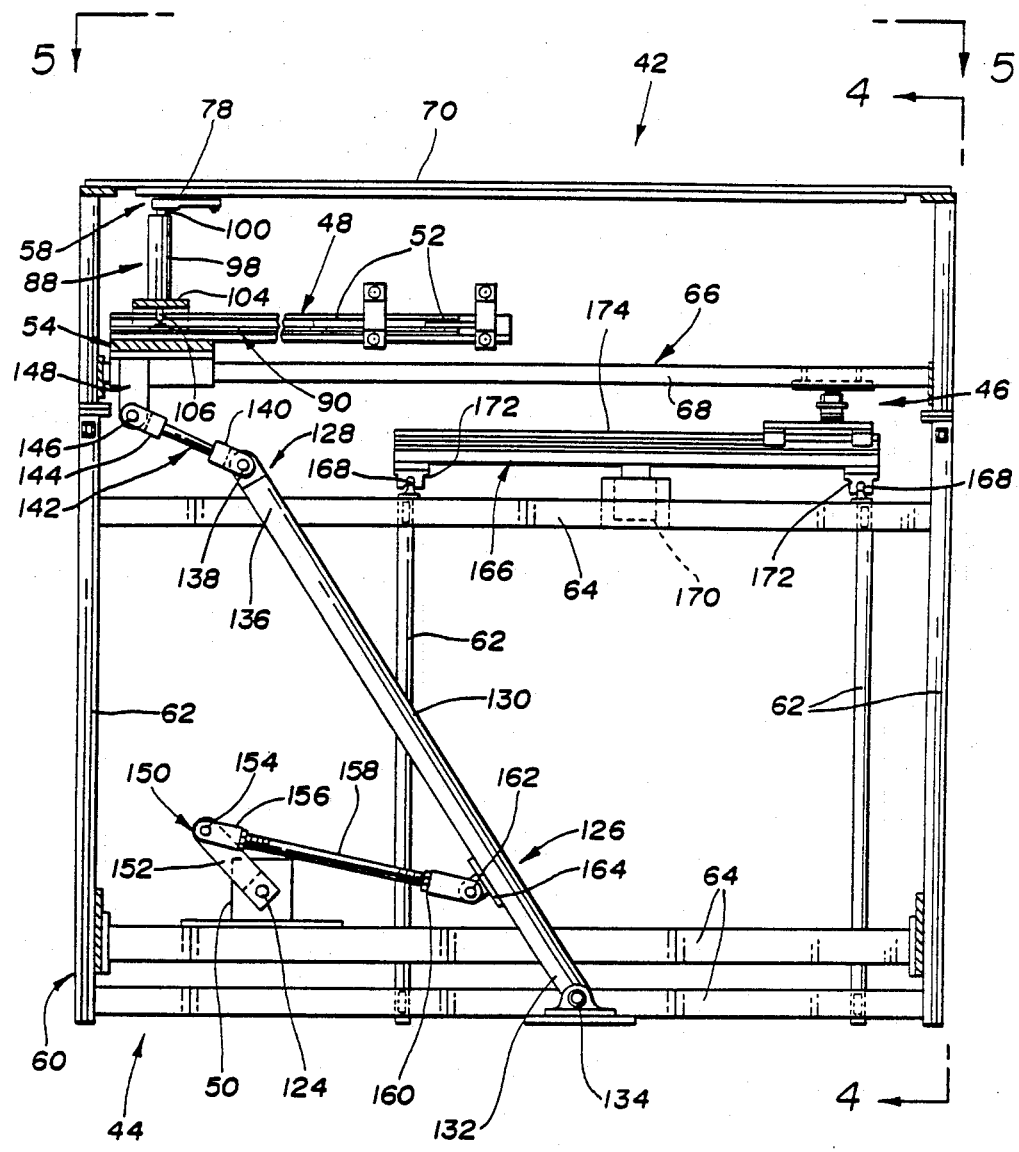
FIG. 3 is a side elevational view taken partially in section along line 3—3 of FIG. 1 to illustrate the construction of the in-mold label dispenser.
Figure 5:
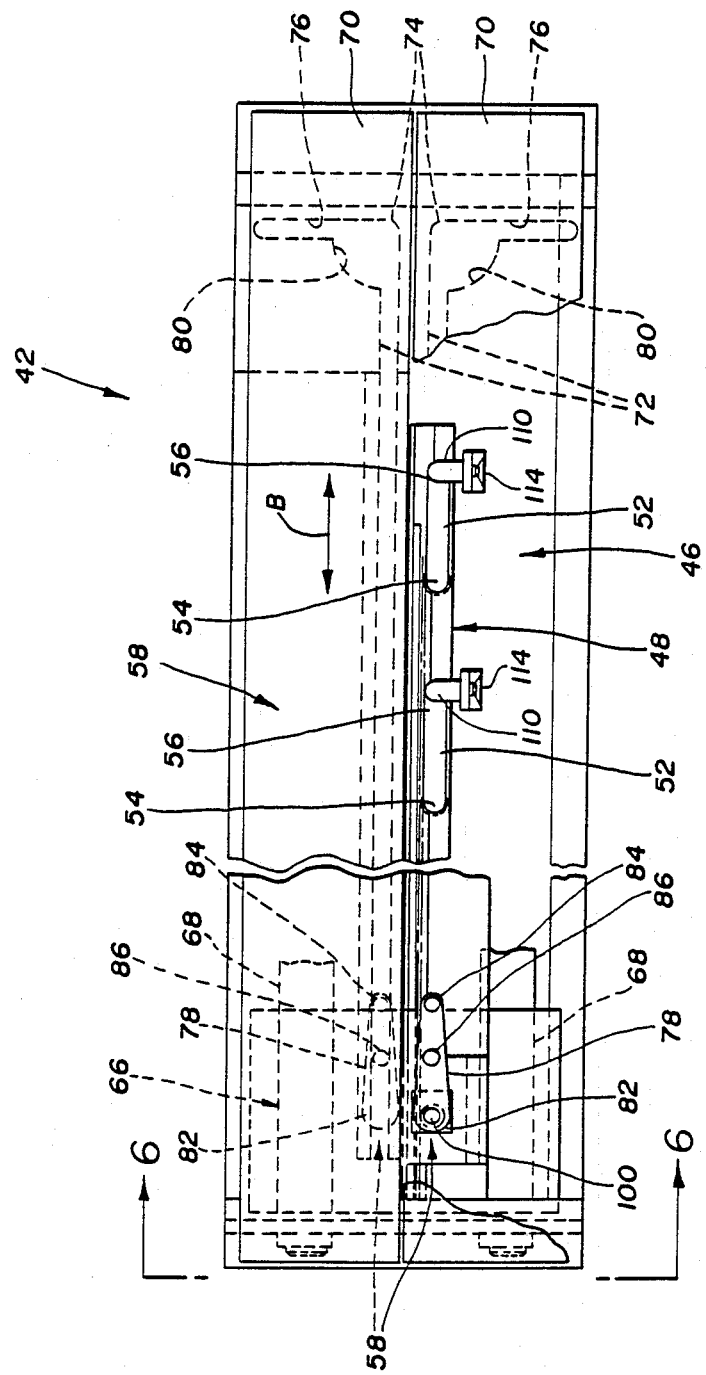
FIG. 5 is a partially broken away top plan view of the in-mold label dispenser taken along the direction of line 5—5 in FIG. 3 to illustrate a cam mechanism that controls movement of label carriers on the dispensing head.
Figure 6:
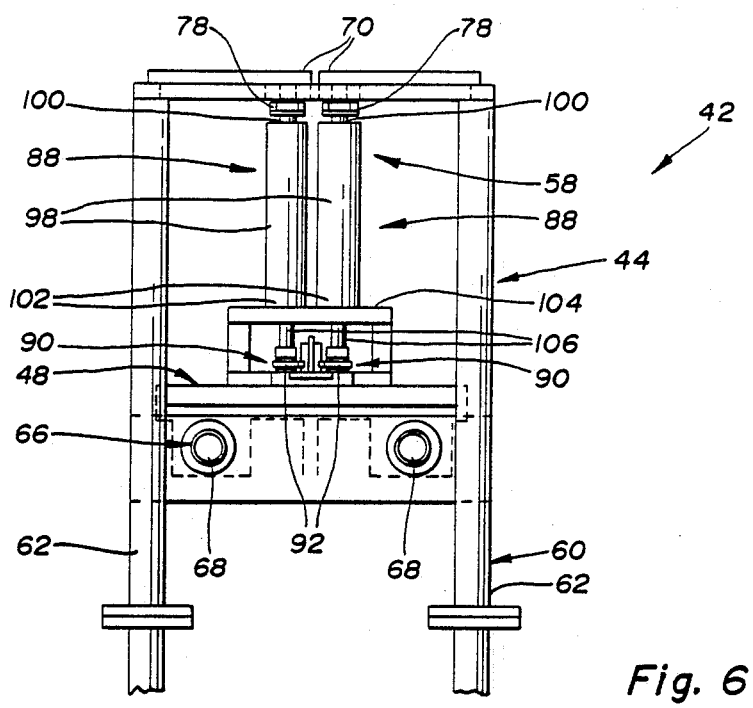
FIG. 6 is an end elevational view taken along the direction of line 6—6 in FIG. 5 to illustrate a connection to the cam mechanism that provides the label carrier movement.

As shown in FIGS. 3, 5, and 6, a cam mechanism 58 of the in-mold label dispenser 42 pivotally moves each label carrier 52 between the retracted position of FIG. 1 and the label transfer position of FIG. 2. This pivoting takes place as the dispensing head 48 moves under the impetus of the actuator 50 to and from the inserted position of FIG. 2 while the second end 56 of the label carrier 52 is moved along the first direction A without any movement along the first direction B to insure accurate positioning of the associated label 57 within the mold 32.

Figure 4:
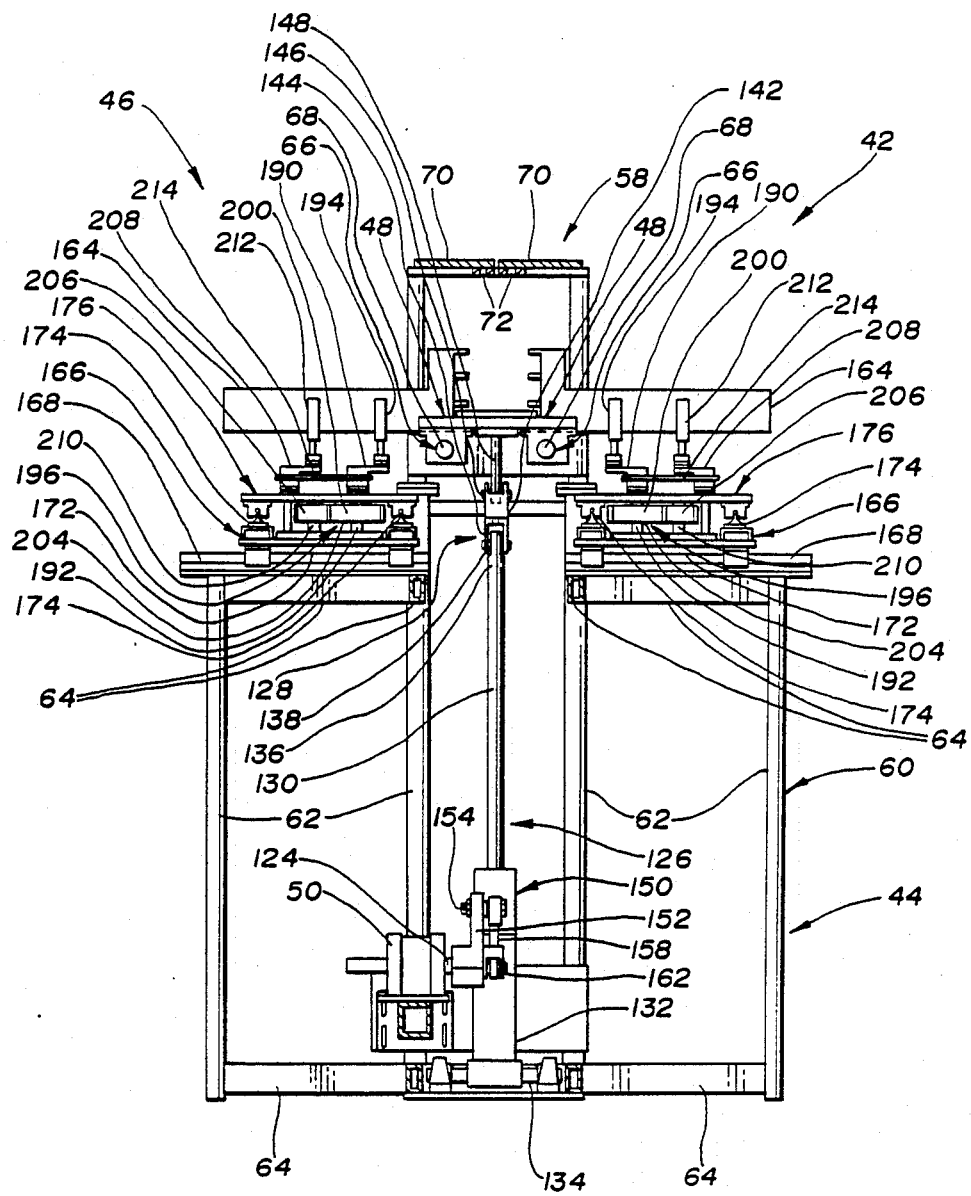
FIG. 4 is an end elevational view of the in-mold label dispenser taken generally along the direction of line 4—4 in FIG. 3.

As illustrated in FIGS. 3 and 4, the base 44 includes a framework 60 fabricated from vertical legs 62 and horizontal beams 64 that connect the legs. As shown in FIGS. 3 through 6, a slideway 66 of the dispenser mounts the dispensing head 48 for movement between the withdrawn position illustrated in FIG. 3 and an inserted position located to the right of the withdrawn position. This slideway preferably includes a pair of parallel rods 68 that extend in a spaced and parallel relationship to each other as shown in FIG. 6 and have opposite ends supported by the base framework 60.

As illustrated in FIG. 1, there are two sets of the label carriers 52 respectively associated with the two mold sections 34 and these label carrier sets are respectively associated with a pair of cams 70 of the cam mechanism 58 shown in FIG. 5. Each cam 70 is mounted on the framework 60 of the base 44 and has a rectilinear slot 72 extending parallel to slideway 66 along the second direction B. Each cam slot 72 includes an end 74 that is located adjacent the blow molding machine mold. At its end 74, the cam slot 72 has a camming surface 76 that extends perpendicular to the cam slot along the first direction A. A pair of cam followers 78 are respectively associated with the pair of cams 70 and each moves along the associated cam slot 72 and cam surface 76 to control positioning of each associated label carrier. Each cam 70 also includes an arcuate opening 80 extending between the camming surface 76 and the cam slot 72. As is hereinafter more fully described, each cam follower 78 has a pivotally mounted end 82 and also includes a first follower member 84 that is cammed by the camming surface 76 and also includes a second follower member 86 that moves through the arcuate opening 80 of the associated cam as the dispensing head is moved to and from the inserted position illustrated in FIG. 2.

Figure 10:
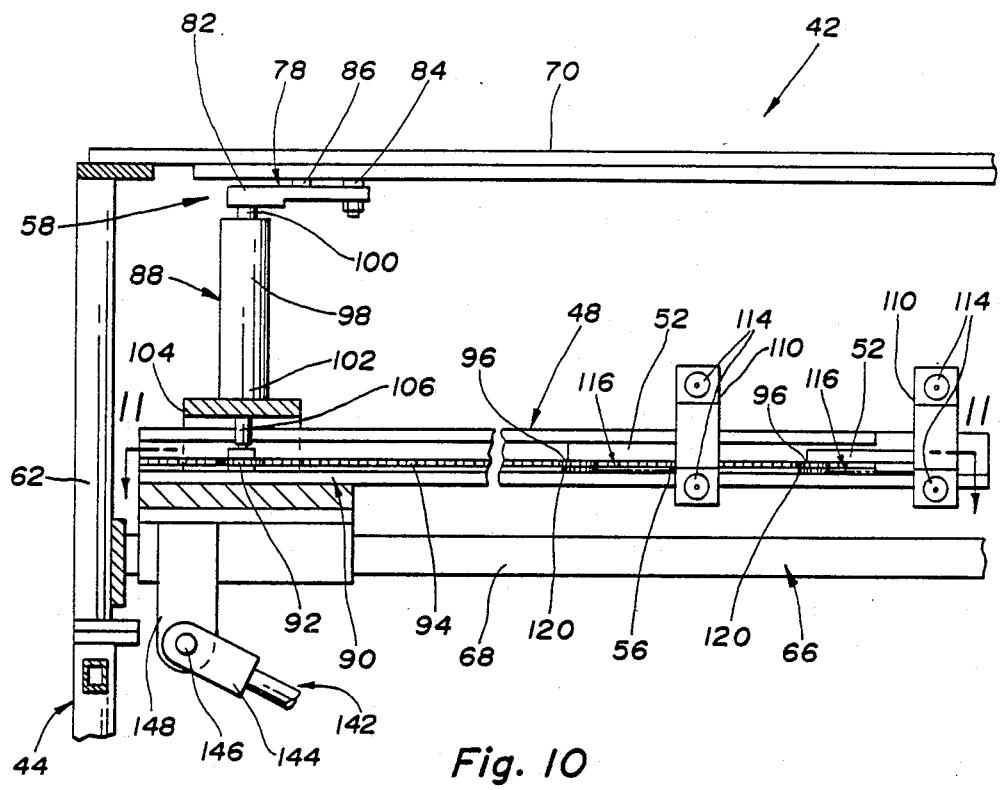
FIG. 10 is an enlarged elevational view of a portion of FIG. 3 illustrating a connection between the cam mechanism and label carriers of the dispenser.
Figure 11:
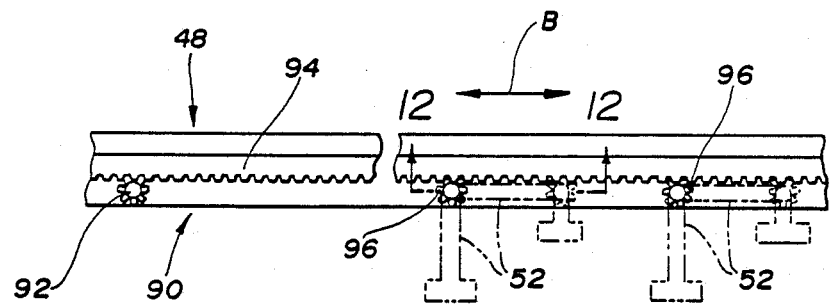
FIG. 11 is a plan view taken along the direction of line 11—11 in FIG. 10 to illustrate a gear and rack set of the connection between the cam mechanism and the label carriers.

As best illustrated in FIGS. 6 and 10, each cam follower 78 of the cam mechanism 58 has a connection 88 to each associated label carrier 52 so as to provide movement thereof between the retracted position of FIG. 1 and the label transfer position of FIG. 2 in response to cam follower movement controlled by the cam. Each connection 88 includes a gear and rack set 90 as illustrated in FIG. 11 for moving each associated label carrier 52 in response to cam follower movement. The gear and rack set includes a first gear 92 rotatable about an axis fixed with respect to the dispensing head 48. An elongated rack 94 of the gear and rack set 90 is slidably mounted on the dispensing head 48 for movement with respect thereto along the second direction B and is meshed with the first gear 92 so as to be moved by rotation of the first gear. The gear and rack set 90 also includes a set of second gears 96 respectively associated with the label carriers 52, as is hereinafter more fully described, such that movement of the rack 94 moves the label carrier between the retracted and label transfer positions.

As shown in FIG. 10, the cam mechanism 58 is located above the label carriers 52 and each connection 88 between the cam mechanism 58 and the associated gear and rack set 90 includes a vertical connector shaft 98 having an upper end 100 that is connected to the cam mechanism by supporting the cam follower end 82 to provide rotational support for the cam follower 78 so as to thereby rotate the shaft in response to the cam follower movement. The connector shaft 98 also has a lower end 102 rotatably supported on an upper plate 104 of the dispensing head 48. This lower shaft end 102 has a reduced diameter portion 106 connected to the first gear 92 of the gear and rack set 90 to rotate the first gear and thereby move the rack and pivot each associated label carrier 52 in response to cam follower movement as the dispensing head is moved to and from the inserted position previously described in connection with FIG. 2.

Figures 12, 13:
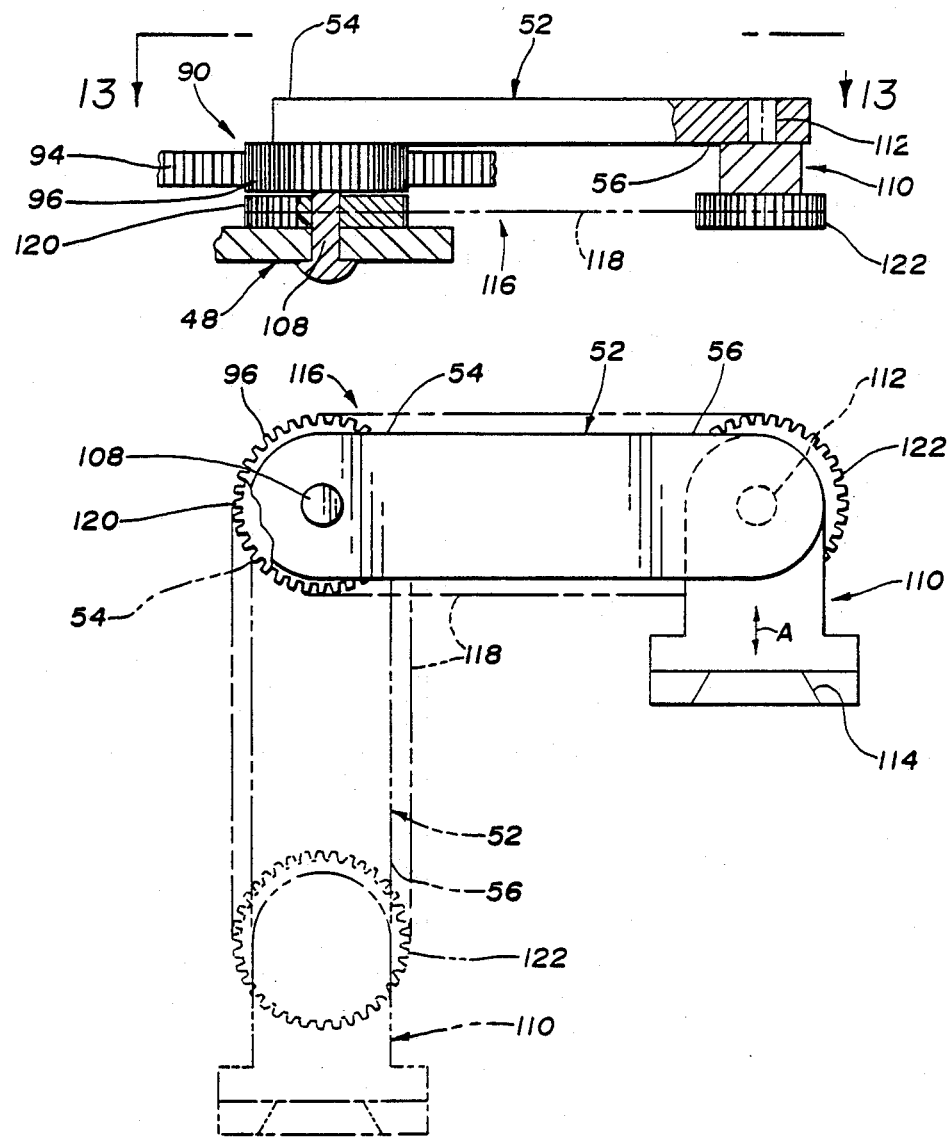
FIG. 12 is an enlarged sectional view taken along the direction of line 12—12 in FIG. 11 to illustrate the label carrier construction and a positioner utilized to orient a label carrier member thereof in response to cam follower movement.
FIG. 13 is a top plan view taken along the direction of line 13—13 in FIG. 12 and illustrating the label carrier by solid line representation in a retracted position and by phantom line representation in a label transfer position.

As illustrated in FIGS. 12 and 13, each label carrier 52 has its end 54 provided with a pin 108 that provides rotatable support thereof on the dispensing head 48. The label carrier end 54 is fixed to the associated second gear 96 of the gear and rack set 90 such that the label carrier is pivoted by the rack movement. Each label carrier 52 also includes a label carrier member 110 having a pin 112 that provides pivotal mounting thereof on the second label carrier end 56. This label carrier member 110 includes at least one suction cup 114 as shown in FIG. 13 for securing the label and is supplied with a suitable vacuum conduit that is not shown to selectively secure the label during the in-mold labeling operation. Each label carrier 52 also includes a positioner 116 that pivots its label carrier member 110 on the label carrier during movement between the retracted and label transfer positions respectively illustrated by solid and phantom line representation in FIG. 13.

As shown in both FIGS. 12 and 13, each label carrier positioner 116 includes a continuous positioning loop 118 as well as a first positioning wheel 120 that is fixed to the dispensing head 48 with the continuous positioning loop received by the first positioning wheel. A second positioning wheel 122 of the positioner 116 is fixed to the associated label carrier member 110 and thus rotatably supported by the shaft portion 112 thereof as well as being moved by the continuous positioning loop 118 to provide positioning thereof as the gear and rack set pivots the label carrier with the fixed first positioning wheel moving the positioning loop 118 to control the movement. Such positioning maintains the label carrier member 110 projecting outwardly along the first direction A in the retracted position, the extended position, and during movement between these positions.

Furthermore, during movement between the retracted and label transfer positions, the label carrier member 110 moves along the first axis A without any movement along the second axis B as the dispensing head moves to and from the inserted position between the open mold sections This provides accurate label registration upon transfer of the labels to the mold cavity sections from the label carrier members 110 moved by the positioners 116. In the preferred construction, the continuous positioning loop 118 of each positioner 116 is a chain and the first and second positioning wheels 120 and 122 are sprockets meshed with the chain so as to provide the label carrier member positioning described above.

With reference to FIGS. 14 through 19, operation of the cam mechanism illustrated in FIGS. 14, 16 and 18 controls movement of each label carrier 52 between the retracted position of FIG. 15 and the label transfer position of FIG. 19 while moving through the intermediate position illustrated by FIG. 17. More specifically, with the dispensing head just adjacent the inserted position illustrated in FIG. 2, the cam mechanism has its cam follower 78 positioned as shown in FIG. 14 and through the connection to each label carrier 52 provides positioning thereof in the retracted position illustrated in FIG. 15. In such position, both the first and second cam follower members 84 and 86 are positioned in alignment with the cam slot 72 previously described with the first follower member ready to move into engagement with the camming surface 76. Continued movement of the dispensing head toward the inserted position moves the first cam follower member 84 along the camming surface 76 as the second cam follower member 86 moves through the arcuate opening 80 of the cam as illustrated in FIG. 16. The connection of the cam mechanism to each label carrier 52 pivots the label carrier as illustrated in FIG. 17 with the positioner 116 moving the associated label carrier member 110 along a straight line path 123 that extends along the first direction A and, as previously mentioned, there is no movement along the second direction B. As the dispensing head moves to the inserted position, the cam mechanism has its cam follower 78 positioned as illustrated in FIG. 18 with its end 82 and first and second cam follower members 84 and 86 located along the camming surface 76, which positions each connected label carrier 52 as shown in FIG. 19 extending outwardly along path 123 along the first direction to provide the label transfer operation illustrated in FIG. 2. Movement of the dispensing head back to the withdrawn position moves the cam follower 78 from the position of FIG. 18 to the position of FIG. 16 and then to the position of FIG. 14 as each label carrier 52 connected thereto moves along path 123 from the label transfer position of FIG. 19 through the intermediate position of FIG. 17 to the retracted position of FIG. 15.

As illustrated in FIGS. 3 and 4, the actuator 50 for moving the dispensing head 54 is illustrated as being embodied by a rotary hydraulic motor whose output 124 is connected by a control linkage 126 to the dispensing head 48. This control linkage 126 includes a positioning linkage 128 having a lower link 130 whose lower end 132 has a pivotal connection 134 to the base framework 60 and whose upper end 136 has a pivotal connection 138 to one end 140 of an upper link 142 of the control linkage 128. The other end 144 of the upper link 142 has a pivotal connection 146 to a downwardly depending connection lug 148 of the dispensing head 48. Linkage 126 also includes a drive linkage 150 including a drive link 152 fixed to the actuator output 124 and having a pivotal connection 154 to one end 156 of a drive link 158 whose other end 160 has a pivotal connection 162 to a connection lug 164 fixed on the lower link 130 of the positioning linkage 128. Unidirectional rotation of the rotary motor output 124 without stopping drives the linkage 150 to move the linkage 128 so as to reciprocate the dispensing head 48 between the retracted position of FIG. 1 and the inserted position of FIG. 2 in order to provide the in-mold label operation previously described. The manner in which the label carrier member 110 moves along the path 123 without any movement along the direction B permits the continual driving of actuator 50 without stopping while still having accurate label registration with the mold.

Figure 8:
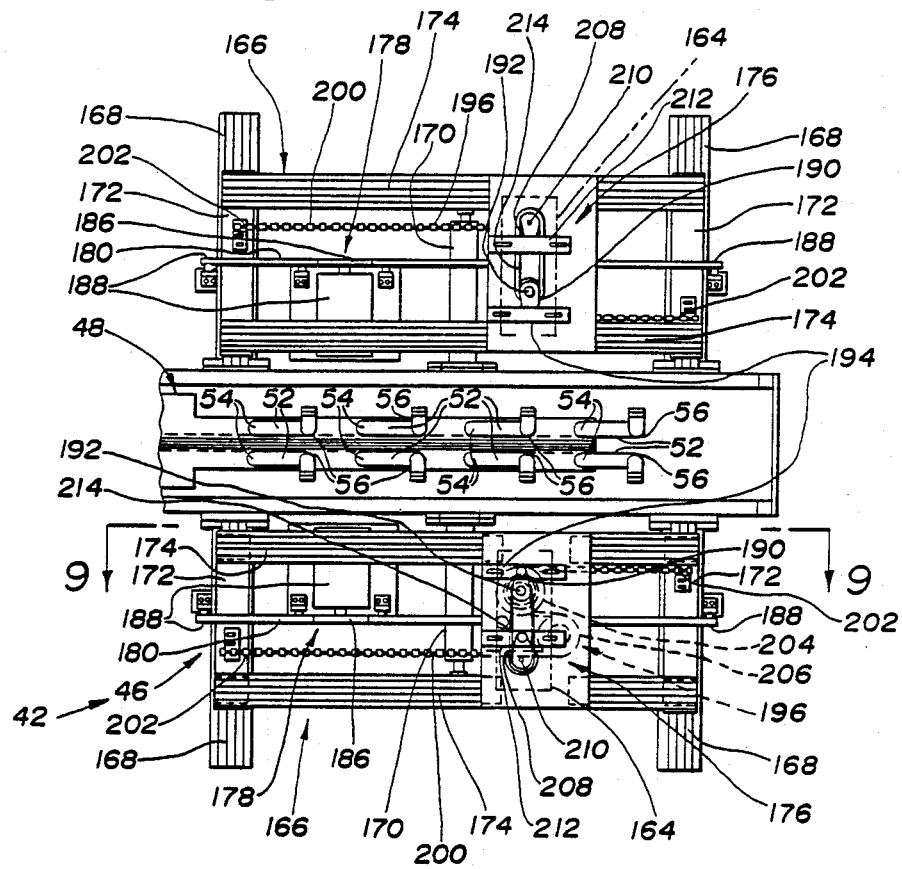
FIG. 8 is a top plan view like FIG. 1 but illustrating the in-mold label dispenser in greater detail.
Figure 9:
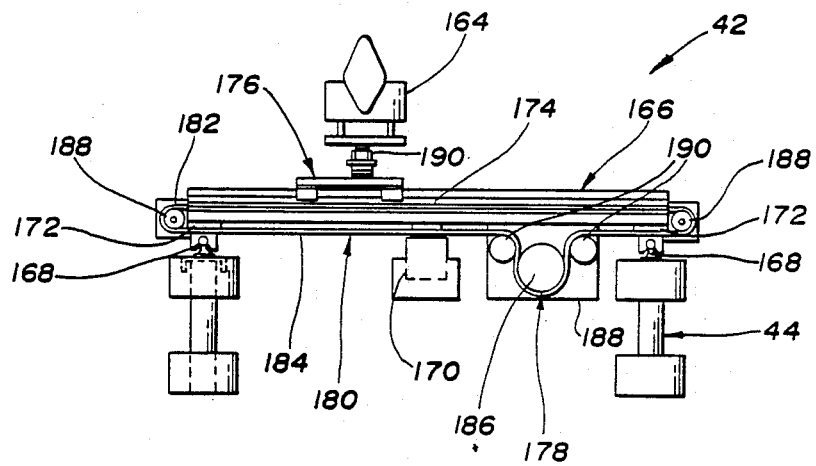
FIG. 9 is an elevational view taken along the direction of line 9—9 in FIG. 8 to illustrate the manner in which a label magazine carrier is moved during dispensing of labels.

As illustrated schematically in FIG. 1, the label supply 46 includes a single label magazine 164 mounted on a shuttle 166 and associated with each set of label carriers 52 for respectively providing labels 57 to the cavity sections 36 of each pair of mold sections 34 of the mold 32. On each side of the dispensing head 48, the base 44 supports a pair of tracks 168 that mount the label magazine shuttle 166 for movement toward and away from the dispensing head under the control of an actuator 170 as respectively shown by the solid and phantom line representation. Each shuttle 166 as shown in FIGS. 8 and 9 includes a pair of end members 172 that are movable along the associated pair of tracks 168 and also includes a pair of tracks 174 that extend between the end members and are affixed thereto to form a generally rectangular configuration. Each shuttle 166 also includes a magazine carrier 176 that is supported for movement along the pair of tracks 174 and mounts the associated label carrier 164 for movement to supply labels to the associated set of label carriers 52.

As illustrated by continuing reference to FIGS. 8 and 9, the in-mold label dispenser includes a carrier actuator 178 that moves the magazine carrier 176 along the associated pair of tracks 174 to provide the application of labels to the label carriers 52. This carrier actuator 178 preferably includes a flexible drive member 180 having an upper reach 182 that is connected to the magazine carrier 176 and having a lower reach 184 that is driven by the output 186 of a rotary hydraulic motor 188. This flexible drive member 180 is preferably embodied by a chain that is received by end sprockets 188 respectively mounted on the pair of end members 172 and is also received by a pair of idler sprockets 190 (FIG. 9) to provide an increased wrap angle about the rotary motor output 186 which is also preferably constructed as a sprocket meshed with the drive chain.

As shown best in FIGS. 7 and 8, each magazine carrier 176 includes an eccentric 190 for moving the associated label magazine 164 toward and away from the label carriers as the label magazine is moved by the carrier actuator 178 previously described in connection with FIG. 9. Each eccentric 190 is rotatable about a shaft 192 on the magazine carrier 176 and includes a support bracket 194 on which the associated label magazine 164 is mounted. A slave actuator 196 rotates the eccentric 190 in response to movement of the magazine carrier 176 under the impetus of the carrier actuator 178 and thereby moves the magazine carrier in a cycloidal path as identified by 198 in FIG. 1. Each slave actuator 196 as shown in FIG. 8 includes a flexible chain or belt 200 having opposite ends 202 respectively fixed to the pair of end members 172 of the shuttle 176. The slave actuator also includes a drive pulley 204 that is driven by the flexible belt 200 as the magazine carrier 176 is moved by the actuator 178 illustrated in FIG. 9. This drive pulley 204 is connected to the shaft 192 of the associated eccentric 190 to provide the movement of the label magazine 164 in the cycloidal path previously described. An idler pulley 206 of each slave actuator 196 provides an increased wrap angle of the flexible belt 200 about the drive pulley 204. Each side of the flexible belt 200 preferably includes a somewhat toothed configuration that meshes with complementary toothed shapes on the drive and idler pulleys 204 and 206 to provide positive driving by the slave actuator 196 in moving the label magazine 164 along the cycloidal path as previously described.

Figure 7:
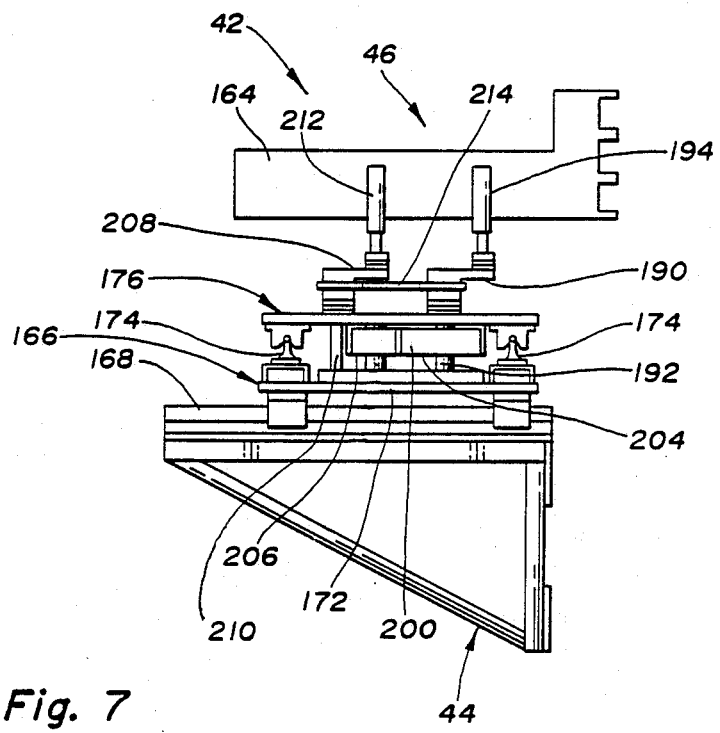
FIG. 7 is an enlarged view of a portion of FIG. 4 and illustrates the manner in which a label magazine is supported to provide labels to a plurality of label carriers of the dispensing head.

As shown in FIGS. 7 and 8, each magazine carrier 176 also preferably includes a slave eccentric 208 rotatable on the carrier about a shaft 210 and including a support bracket 212 that cooperates with the support bracket 194 of the eccentric 190 to support the associated label magazine 164. A continuous belt 214 of each magazine carrier 176 connects the eccentric 190 and the slave eccentric 208 to provide coordinated movement of the associated support brackets 194 and 212 in order to provide the label magazine movement in the cycloidal path that distributes the labels to the label carriers 52 as previously described.

Figure 20:
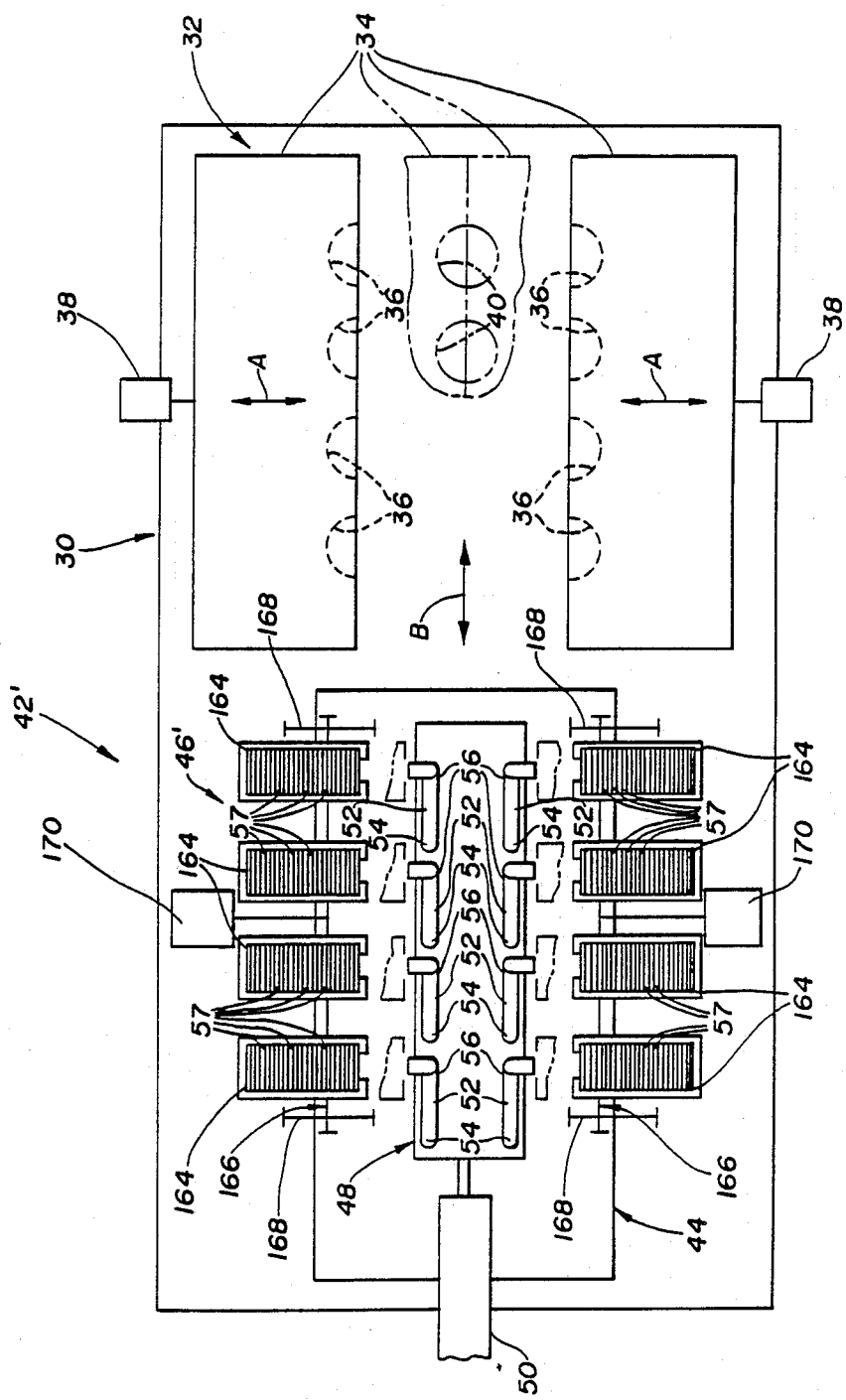
FIG. 20 is a plan view similar to FIG. 1 of another embodiment of the in-mold label dispenser which includes a plurality of label magazines for simultaneously supplying labels to all of the label carriers on the dispensing head.

With reference to FIG. 20, another embodiment of the in-mold label dispenser 42' has a label supply 46' that includes a plurality of the label magazines 164 mounted on each shuttle 166. Movement of the shuttle 166 between the retracted position illustrated by solid line representation of the label magazines and the label transfer position illustrated by phantom line representation of the label magazines simultaneously supplies labels 57 to all of the label carriers 52. Otherwise, this embodiment 42' of the in-mold label dispenser has the same construction as the previously described embodiment.

While the best modes for carrying out the invention have been described in detail, those familiar with the art to which this invention relates will recognize alternative designs and embodiments for practicing the invention as defined by the following claims.

What is claimed is:

1. An in-mold label dispenser for supplying labels to a plastic blow molding machine mold including a pair of mold sections that define cavity sections and are mounted for movement along a first direction toward and away from each other without any other movement between an open position spaced from each other and a closed position where the cavity sections define an enclosed cavity in which blow molding is performed, the label dispenser comprising: a base; a label supply; a dispensing head mounted by the base for rectilinear movement in a second direction perpendicular to the first direction between a withdrawn position with respect to the mold and an inserted position between the open mold sections; an actuator that moves the dispensing head between the withdrawn and inserted positions; a label carrier having an elongated shape including a first end pivotally mounted on the dispensing head and a second end for carrying labels from the label supply to the mold; the label carrier having a retracted position where the elongated shape thereof extends from the first end thereof toward the mold to the second end thereof along the second direction during movement of the dispensing head between the withdrawn and inserted positions; the label carrier having a label transfer position where the elongated shape thereof extends from the first end thereof toward the second end thereof along the first direction to transfer a label thereon to the mold; and a cam mechanism that pivotally moves the label carrier between the retracted and label transfer positions as the dispensing head moves under the impetus of the actuator to and from the inserted position while the second end of the label carrier is moved along the first direction during the pivoting of the label carrier to ensure accurate positioning of the label within the mold.

2. An in-mold label dispenser as in claim 1 wherein the base includes a slideway that mounts the dispensing head for movement between the withdrawn and inserted positions, the cam mechanism including a cam mounted by the base and having a rectilinear slot that extends parallel to the slideway along the second direction, the cam slot including an end adjacent the mold where the cam has a camming surface that extends along the first direction perpendicular to the cam slot, and the cam mechanism including a cam follower that moves along the cam slot and the cam surface to control the positioning of the label carrier.

3. An in-mold label dispenser as in claim 2 wherein the slideway includes a pair of parallel rods on which the dispensing head is slidably supported.

4. An in-mold label dispenser as in claim 2 wherein the cam also includes an arcuate opening extending between the camming surface and the cam slot, the cam follower including a first follower member that is cammed by the camming surface of the cam and also including a second follower member that moves through the arcuate opening of the cam as the dispensing head is moved to and from the inserted position.

5. An in-mold label dispenser as in claim 2 further including a connection between the cam mechanism and the label carrier for moving the label carrier between the retracted and label transfer positions in response to cam follower movement controlled by the cam.

6. An in-mold label dispenser as in claim 5 wherein the connection includes a gear and rack set for moving the label carrier in response to cam follower movement.

7. An in-mold label dispenser as in claim 6 wherein the gear and rack set includes a first gear rotated by the cam follower movement, an elongated rack moved by the first gear, and a second gear rotated by the rack movement and connected to the label carrier to provide pivoting thereof between the retracted and label transfer positions.

8. An in-mold label dispenser as in claim 7 wherein the cam mechanism is located above the label carrier, the connection between the cam mechanism and the gear and rack set including a vertical connector shaft having an upper end connected to the cam mechanism to rotate the shaft in response to cam follower movement, and the shaft having a lower end connected to the first gear of the gear and rack set to rotate the first gear and thereby move the rack and rotate the second gear to pivot the label carrier in response to cam follower movement.

9. An in-mold label dispenser as in claim 8 wherein the second end of the label carrier includes a label carrier member pivotally mounted thereon, and a positioner that pivots the label carrier member on the label carrier during the movement between the retracted and label carrier positions.

10. An in-mold label dispenser as in claim 9 wherein the positioner includes: a continuous positioning loop, a first positioning wheel that moves the continuous positioning loop in coordination with the second gear of the gear and rack set, and a second positioning wheel that is rotated by the continuous positioning loop and fixed to the label carrier member to provide positioning thereof as the gear and rack set pivots the label carrier.

11. An in-mold label dispenser as in claim 10 wherein the continuous positioning loop of the positioner is a chain, and the first and second positioning wheels of the positioner being sprockets meshed with the chain.

12. An in-mold label dispenser as in claims 1, 2, or 9 which includes a plurality of the label carriers for supplying labels to a multiple cavity type mold; and each label carrier being movable by operation of the cam mechanism between the retracted and label transfer positions.

13. An in-mold label dispenser as in claim 12 wherein the label supply includes a label magazine shuttle and a shuttle actuator that moves the shuttle between a retracted position and a label transfer position with respect to the label carriers.

14. An in-mold label dispenser as in claim 13 wherein the label supply includes a plurality of the label magazines mounted on the magazine shuttle to simultaneously supply labels to all of the label carriers upon movement of the shuttle under the impetus of the shuttle actuator from the retracted position to the label transfer position.

15. An in-mold label dispenser as in claim 13 wherein the shuttle includes a magazine carrier mounted thereon and supporting the label magazine for movement to supply labels to a plurality of label carriers.

16. An in-mold label dispenser as in claim 15 which includes a carrier actuator that moves the magazine carrier along the shuttle.

17. An in-mold label dispenser as in claim 16 wherein the carrier actuator includes a flexible drive member connected to the magazine carrier and a rotary motor that drives the flexible drive member to move the magazine carrier.

18. An in-mold label dispenser as in claim 17 further including an eccentric for moving the label magazine toward and away from the label carriers as the magazine carrier is moved by the carrier actuator.

19. An in-mold label dispenser as in claim 18 further including a slave actuator that moves the eccentric in response to movement of the magazine carrier under the impetus of the carrier actuator.

20. An in-mold actuator as in claim 19 wherein the slave actuator includes a flexible belt having opposite ends connected to the shuttle, the slave actuator including a drive pulley driven by the flexible belt as the magazine carrier is moved by the carrier actuator, and the drive pulley being connected to the eccentric to move the label magazine.

21. An in-mold label dispenser as in claim 20 wherein the slave actuator also includes an idler pulley that provides an increased wrap angle of the flexible belt about the drive pulley.

22. An in-mold label dispenser as in claim 21 which also includes a slave eccentric, and a continuous belt that connects the eccentric to drive the slave eccentric.

23. An in-mold label dispenser for supplying labels to a plastic blow molding machine mold including a pair of mold sections each of which defines a plurality of cavity sections and is mounted for movement along a first direction toward and away from the other mold section without any other movement between an open position spaced from the other mold section and a closed position where the cavity sections define a plurality of enclosed cavities in which blow molding is performed, the label dispenser comprising: a base; a label supply; a dispensing head mounted by the base for rectilinear movement in a second direction perpendicular to the first direction between a withdrawn position with respect to the mold and an inserted position between the open mold sections; an actuator that moves the dispensing head between the withdrawn and inserted positions; a plurality of label carriers respectively associated with the cavities; each label carrier having an elongated shape including a first end pivotally mounted on the dispensing head and a second end for carrying labels from the label supply to the mold; the label carriers having a retracted position where the elongated shape of each label carrier extends from the first end thereof toward the mold to the second end thereof along the second direction during movement of the dispensing head between the withdrawn and inserted positions; the label carriers having a label transfer position where the elongated shape of each label carrier extends from the first end thereof toward the second end thereof along the first direction to transfer a label thereon to the mold; and a cam mechanism that pivotally moves the label carriers between the retracted and label transfer positions as the dispensing head moves under the impetus of the actuator to and from the inserted position while the second end of the label carriers are moved along the first direction during the pivoting of the label carrier to ensure accurate positioning of the label within the mold.

24. An in-mold label dispenser for supplying labels to a plastic blow molding machine mold including a pair of mold sections each of which defines a plurality of cavity sections and is mounted for movement along a first direction toward and away from the other mold section without any other movement between an open position spaced from the other mold section and a closed position where the cavity sections define a plurality of enclosed cavities in which blow molding is performed, the label dispenser comprising: a base; a label supply; a dispensing head mounted by the base for rectilinear movement in a second direction perpendicular to the first direction between a withdrawn position with respect to the mold and an inserted position between the open mold sections; an actuator that moves the dispensing head between the withdrawn and inserted positions; a label carrier having an elongated shape including a first end pivotally mounted on the dispensing head and a second end for carrying labels from the label supply to the mold; each label carrier including a label carrier member pivotally mounted on the second end thereof and also including a positioner that pivotally positions the label carrier member; the label carrier having a retracted position where the elongated shape thereof extends from the first end thereof toward the mold to the second end thereof along the second direction during movement of the dispensing head between the withdrawn and inserted positions; the label carrier having a label transfer position where the elongated shape thereof extends from the first end thereof toward the second end thereof along the first direction to transfer a label thereon to the mold; a cam mechanism including a cam, a cam follower moved by the cam, and a gear and rack set connected to the cam follower to pivotally move the label carriers between the retracted and label transfer positions as the dispensing head moves under the impetus of the actuator to and from the inserted position while the second end of the label carrier is moved along the first direction during the pivoting of the label carrier to ensure accurate positioning of the label within the mold; and the cam mechanism also controlling the positioner of each label carrier to orient the label carrier member thereof along the first direction in the retracted and extended positions and during movement between these positions.

25. An in-mold label dispenser for supplying labels to a plastic blow molding machine mold including a pair of mold sections each of which defines a plurality of cavity sections and is mounted for movement along a first direction toward and away from the other mold section without any other movement between an open position spaced from the other mold section and a closed position where the cavity sections define a plurality of enclosed cavities in which blow molding is performed, the label dispenser comprising: a base; a dispensing head mounted by the base for rectilinear movement in a second direction transverse to the first direction between a withdrawn position with respect to the mold and an inserted position between the open mold sections; an actuator that moves the dispensing head between the withdrawn and inserted positions; a plurality of label carriers respectively mounted on the dispensing head; a label supply including a single label magazine; a magazine carrier that supports the label magazine for movement adjacent the dispensing head when the dispensing head is in the withdrawn position; a magazine actuator; and an eccentric rotatively driven by the magazine actuator and moving the magazine carrier in a cycloidal path while the dispensing head remains stationary in the withdrawn position in order to supply labels from the label magazine to said plurality of label carriers.

26. An in-mold label dispenser as in claim 25 wherein the carrier actuator includes a slave actuator having a flexible belt that rotates the eccentric as the magazine carrier is moved.

27. An in-mold label dispenser as in claim 26 further including a slave eccentric and a continuous belt that drives the slave eccentric from said first mentioned eccentric.

* * * * *